United States Patent [19]

Contessi

[11] Patent Number: 5,601,772
[45] Date of Patent: Feb. 11, 1997

[54] METHOD TO PRODUCE BOWLS OF A PLASTIC MATERIAL AND BOWLS THUS PRODUCED

[75] Inventor: Claudia Contessi, Dignano, Italy

[73] Assignee: Plastic Legno Giocattoli di Contessi & C.Snc, Dignano, Italy

[21] Appl. No.: 527,433

[22] Filed: Sep. 13, 1995

Related U.S. Application Data

[63] Continuation of Ser. No. 283,920, Aug. 3, 1994, abandoned.

[30] Foreign Application Priority Data

Aug. 12, 1993 [IT] Italy ................... UD93A0161

[51] Int. Cl.$^6$ ................... B29C 45/00
[52] U.S. Cl. ................... 264/328.1; 264/328.8; 264/331.15; 264/129; 264/22; 264/154; 264/478
[58] Field of Search ........... 264/328.1, 328.18, 264/331.15, 129, 22, 154

[56] References Cited

U.S. PATENT DOCUMENTS

| | | | |
|---|---|---|---|
| 3,498,268 | 3/1970 | Sleith | 119/61 |
| 3,924,856 | 12/1975 | Dekan | 273/106 R |
| 4,141,559 | 2/1979 | Melvin | 273/220 |
| 4,165,875 | 8/1979 | Dykehouse | 273/82 R |
| 4,210,992 | 7/1980 | Murray | 29/525 |
| 4,766,172 | 8/1988 | Weber | 524/783 |
| 4,948,006 | 8/1990 | Okabe | 220/67 |

FOREIGN PATENT DOCUMENTS 3641881  6/1988  Germany.

OTHER PUBLICATIONS

Translation of DE 3,641,881 (Jun. 1988).
"Propylene Polymers" in *Encyclopedia of Polymer Science and Engineering* (second edition) 1989, pp. 510–511.

*Primary Examiner*—Vasu S. Jagannathan
*Attorney, Agent, or Firm*—Breiner & Breiner

[57] ABSTRACT

Method to produce bowls of a plastic material, whereby polypropylene is mixed with an additive and/or dye after suitable dosing and is introduced into a moulding press, wherein it is heated to 180°–210° C., and is then injected into a mould, where it is kept under a further pressure for 20–60 seconds, the product then being extracted and cooled in water before removal of flash so as to produce the bowl. Bowl consisting of polypropylene and produced according to the above method.

13 Claims, 1 Drawing Sheet

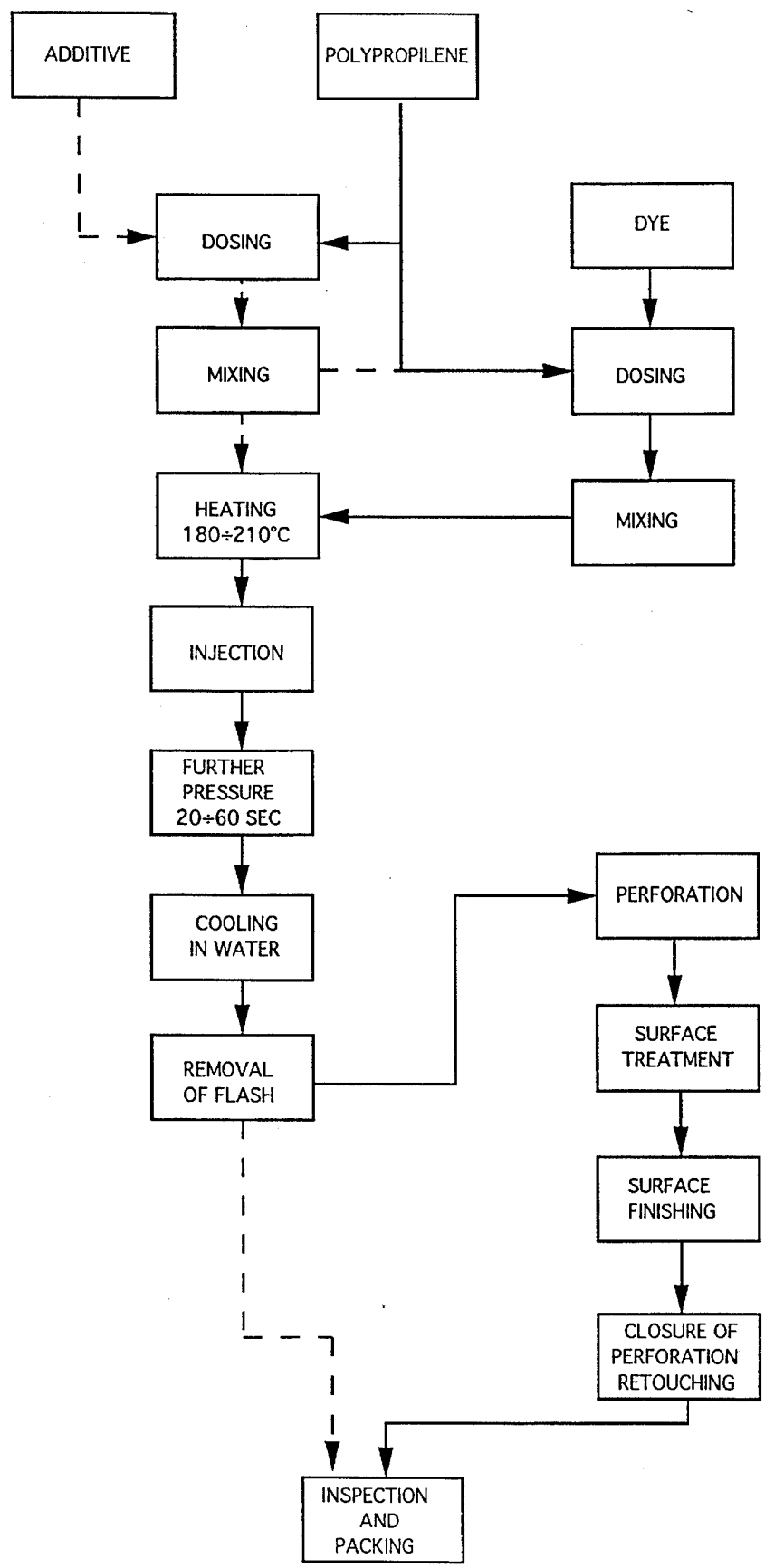

5,601,772

METHOD TO PRODUCE BOWLS OF A PLASTIC MATERIAL AND BOWLS THUS PRODUCED

This is a continuation of application Ser. No. 08/283,920 filed on Aug. 3, 1994, now abandoned.

This invention concerns a method to produce bowls of a plastic material. It concerns also the bowls thus produced, as set forth in the respective main claims.

The bowls with which this invention is concerned are those spherical objects used for the so-called game of bowls.

Bowls at the present time are made of wood, of special types of stone, of ivory, of sawdust mixed with adhesives and of a plastic.

Plastic bowls are made either by creating an envelope which is then filled with water under pressure or by moulding a plastic filled with sawdust.

In the case of a plastic filled with sawdust, hygroscopic problems are created owing to the plastic material used heretofore.

The plastic bowls of the state of the art entail problems of dimensional stability, impact strength, hygiene, healthy conditions and toxicity owing to the type of plastic used hitherto.

Moreover, the plastic bowls of the state of the art do not comply with the necessary weight/dimension ratio and are therefore only used for improvised sports activities of a family type.

In fact, with a low weight/dimension ratio a bowl does not possess enough inertia to retain its direction and any small bulge in the ground is enough to deviate its path.

So as to overcome the shortcomings of the state of the art and to produce plastic bowls which are not only non-toxic and hygienically suitable but which possess the desired weight:dimension ratio, are resistant to impacts and humidity and are of a professional or semi-professional type, the present applicants have carried out extensive work in research, experiments and selection until they found a suitable basic plastic material which has never been employed hitherto in these products owing to the implicit difficulties of its use which originally discouraged its employment.

The applicants have also been able to perfect the relative production method for making the bowls.

The method to produce plastic bowls and the relative plastic bowls are set forth in the relative main claims, while the dependent claims describe variants of the idea of the main solution.

The invention enables bowls of a semi-professional or professional type to be produced directly without mechanical finishing processes.

According to the invention polypropylene is employed as a basic plastic material so as to overcome problems of toxicity, resistance to humidity, ability to resist impacts and also dimensional stability and so as to possess a good weight: dimension ratio.

According to a variant the basic material consisting of polypropylene is filled with one or another, or with a combination of two or more, of the following additives:powdered wood, mixtures of elastometers, talc, fibres, mineral powders or equivalents.

Polypropylene, even when thus filled, has good compatibility with the skin and with the mucous membrane and is physiologically harmless. Moreover, it does not lose its particular attributes identified by the present applicants. This fact enables bowls to be produced which can be handled by anyone, even children.

If a first special colouring is to be obtained, the polypropylene is mixed with a dye or predominant colouring agent. This mixing can take place with a pre-mixing of determined amounts or by continuous additions and continuous mixing of the two components during the step of delivery to the moulding machine.

The moulding machine according to the invention is an injection press including advantageously a closure nozzle.

The applicants have found that an excellent condition for producing bowls is that the temperature of the molten mass is between 180° C. and 210° C. and the injection pressure is between 700 and 1000 bar, depending on the size of the bowl; the mould is kept advantageously at about 50° C. to 60° C.; the period of the further pressure in the mould is between 20 to 60 seconds, depending on the size of the bowl.

When extracted, the bowl has a temperature of about 60° C. to 70° C. and is placed at once in a tank with water at 18° C. to 20° C. for complete cooling and for an accurate thermal treatment.

According to a variant the water is continuously stirred.

The bowl, when it is cold, that is to say, when it has a temperature near the ambient temperature, has any flash removed and is finished and then inspected and packed.

The bowl, if it has to receive a surface treatment, is instead perforated to lodge a hook for the successive finishing processes.

The bowl thus prepared undergoes a surface pre-treatment by flame or by electronic surface discharges or by being dipped in a primer.

The primer is a liquid which attacks the surface of the bowl chemically, just as the flame and electronic discharges attack the surface, thus creating the conditions necessary for the colour deposited to be anchored thereafter in a stable manner.

When the surface of the bowl is ready, the bowl is dipped in a bath of enamel, which has the desired final colour advantageously like the colour added to the basic material.

The enamel is advantageously of a two-component type so that, when the reaction has taken place, the enamel forms a protective finishing surface layer, which is very strong and stable and powerfully anchored to the bowl.

The finishing process can also be carried out by being applied by spraying.

When the surface of the bowl has been finished and the finish has stabilised, the perforation is closed and retouched, and the bowl is ready for inspection and packing.

BRIEF DESCRIPTION OF THE DRAWING

The attached diagram shows the method according to the invention with its variants.

I claim:

1. Method of producing a one piece spherical solid plastic bowl comprising providing a mixture of polypropylene and at least one additive and/or a dye after suitable dosing, introducing said mixture into a molding press, heating said mixture to a temperature of 180°–210° C. to provide a molten mass, injecting said molten mass under pressure into a mold maintained at a temperature of 50°–60° C., and maintaining under pressure following injection for 20–60 seconds to provide a one piece spherical solid plastic bowl, extracting the plastic bowl from the mold, and cooling the plastic bowl in water prior to removal of flash from the bowl.

2. Method according to claim 1 wherein pressure during injection into the mold is between 700 and 1000 bar.

3. Method according to claim 1 wherein the molding press includes a closure nozzle.

4. Method according to claim 1 wherein the at least one additive is powdered wood.

5. Method according to claim 1 wherein the at least one additive is a mixture of elastomers.

6. Method according to claim 1 wherein the at least one additive is talc.

7. Method according to claim 1 wherein the at least one additive is fibres.

8. Method according to claim 1 wherein the at least one additive is mineral powder.

9. Method according to claim 1 wherein said method further comprises perforating the spherical plastic bowl in a manner such that a hook can be attached to the bowl.

10. Method according to claim 1 wherein said method further comprises treating the spherical plastic bowl's exterior surface with a flame or electrical surface discharge and, thereafter, finishing the bowl with an enamel paint.

11. Method according to claim 1 wherein said method further comprises dipping the spherical plastic bowl in a primer and, thereafter, finishing the bowl with an enamel paint.

12. Method according to claim 10 or claim 11 wherein the enamel paint is a two-component paint.

13. A spherical plastic bowl produced by a method according to claim 1.

* * * * *